(12) United States Patent
Klotz

(10) Patent No.: US 8,851,546 B2
(45) Date of Patent: Oct. 7, 2014

(54) FOLDING LATERAL EXTENSION ADJOINING AT LEAST ONE LOADING SURFACE OF A CARGO-CARRYING VEHICLE

(75) Inventor: Martin Klotz, Gresswiller (FR)

(73) Assignee: Lohr Industrie, Hangenbieten (FR)

( * ) Notice: Subject to any disclaimer, the term of this patent is extended or adjusted under 35 U.S.C. 154(b) by 7 days.

(21) Appl. No.: 13/812,309

(22) PCT Filed: Jul. 25, 2011

(86) PCT No.: PCT/IB2011/053305
§ 371 (c)(1),
(2), (4) Date: Mar. 7, 2013

(87) PCT Pub. No.: WO2012/014144
PCT Pub. Date: Feb. 2, 2012

(65) Prior Publication Data
US 2013/0180428 A1 Jul. 18, 2013

(30) Foreign Application Priority Data

Jul. 26, 2010 (FR) .................................. 10 03127

(51) Int. Cl.
*B60R 3/00* (2006.01)
*B60P 1/00* (2006.01)
*B62D 33/02* (2006.01)
*B60P 3/08* (2006.01)
*B61D 17/00* (2006.01)
*B62D 33/08* (2006.01)
*B60P 3/07* (2006.01)

(52) U.S. Cl.
CPC . *B62D 33/08* (2013.01); *B60P 1/00* (2013.01); *B62D 33/0207* (2013.01); *B60P 3/08* (2013.01); *B61D 17/00* (2013.01); *B60P 3/07* (2013.01)
USPC .......................................... 296/26.15; 410/24

(58) Field of Classification Search
CPC ........................................................ B60P 3/08
USPC .......... 296/26.01, 26.02, 26.12, 26.13, 26.14, 296/26.15, 10; 410/24, 24.1; 105/393
See application file for complete search history.

(56) References Cited

U.S. PATENT DOCUMENTS 2,009,149 A * 7/1935 Pierce .............................. 410/29
2,730,400 A * 1/1956 Francis ........................ 410/28.1

(Continued)

FOREIGN PATENT DOCUMENTS

| CA | 2 410 135 A1 | 6/2004 |
| GB | 2465255 A | 5/2010 |
| WO | 2008/117065 A1 | 10/2008 |

OTHER PUBLICATIONS

French Search Report Corresponding to FR 10/03127.

(Continued)

*Primary Examiner* — Pinel Romain
(74) *Attorney, Agent, or Firm* — Davis & Bujold, PLLC; Michael J. Bujold

(57) ABSTRACT

A lateral extension (1), for road and rail vehicles, comprising a multitude of individual shafts (5) assembled so as to pivot freely, at each of their extremities, firstly, with regard to the interior extremity secured to the vehicle, on a longitudinal structure (11) that is fixed in relation to the load-carrying platform and, secondly, as regards the exterior extremity, on an edge and connecting rigid longitudinal member (10). The shafts bear, over a portion of their length, on an adjacent flat support surface (13) that is fixed in relation to the load-carrying platform, and are cantilevered towards the exterior over the remainder of their length. The extension can be moved to a deployed position, so that the supporting surface (14) provides a passageway, and, a retracted position of lesser width, and incorporates a railing. A changeover from one position to the other is accomplished by pivoting in a horizontal plane.

23 Claims, 4 Drawing Sheets

(56) References Cited

U.S. PATENT DOCUMENTS 2,834,631 A * 5/1958 Taraldsen .................. 410/29
4,015,858 A * 4/1977 Love ........................ 280/656
4,397,498 A * 8/1983 Joynt et al. ............... 296/184.1
4,943,106 A * 7/1990 Hunt ........................ 296/26.15
5,924,754 A * 7/1999 Kuhns ...................... 296/26.15

OTHER PUBLICATIONS

International Search Corresponding to PCT/IB2011/053305

* cited by examiner

FOLDING LATERAL EXTENSION ADJOINING AT LEAST ONE LOADING SURFACE OF A CARGO-CARRYING VEHICLE This application is a National Stage completion of PCT/IB2011/053305 filed Jul. 25, 2011, which claims priority from French patent application Ser. No. 10/03127 filed Jul. 26, 2010.

FIELD OF THE INVENTION

The present invention concerns a deployable structure that is a retractable lateral extension intended to be assembled on the side of at least one platform of a load-carrying vehicle, in order to serve as a load-carrying base or to allow an operator to walk comfortably and without danger along this load-carrying platform when it is loaded, when the vehicle is halted.

The invention concerns the technical field of transportation by vehicles of any kind—particularly, but not exclusively, that of car-carrying vehicles, whether they be trucks, trailers, semi-trailers, or railway wagons or platforms.

BACKGROUND OF THE INVENTION

In order to simultaneously transport as many vehicles as possible, current car-carrying vehicles conventionally incorporate several load-carrying decks of variable and adjustable height, on which cars or other motor-driven vehicles and, generally, road-hauled loads are successively loaded, transported and unloaded.

When the load-carrying vehicle is halted, it is sometimes necessary for the operator to assemble upon the load-carrying platforms and move along them, in order to perform certain technical or maintenance operations, or even just to perform simple safety checks—for example, to level or detach the transported vehicles, to gain access to a vehicle to be unloaded, or simple to lower the load-carrying platform after having loaded a vehicle to be transported.

While the operator can easily move around on the load-carrying platforms when they are unloaded, the situation is very different once they have been loaded with vehicles to be transported.

This is because, so as to optimize the transportation, the load-carrying area is generally filled to the greatest possible extent with vehicles to be transported, positioned such as to leave as little space as possible, especially laterally for the movement of an operator. The widest can attain or even sometimes slightly extend beyond the lateral edge of the platform on which they are loaded.

Therefore, the operator is required to walk very near the lateral edge of the load-carrying platform, which is impractical and rather unsafe for the upper platform of the car-carrying vehicle, even if fall-prevention systems are installed.

However, it is not possible to make larger load-carrying platforms that incorporate an additional area left free for passageway for the operator. This is because, when traveling, the car-carrying vehicle is supposed to comply with the various road or rail gauges applicable to it.

SUMMARY OF THE INVENTION

The aim of the invention is to allow the operator to move comfortably and safely along a load-carrying platform, including the top deck, of a halted car-carrying vehicle, without decreasing the surface area available for loading, and without a notable increase in the width of the car-carrying vehicle while it is traveling, while ensuring that the road or rail gauge is complied with.

To solve this technical problem, the invention relates to a lateral extension of pedestrian passageway, but also, in a general manner, of support, this extension being intended to be positioned along the length of at least one load-carrying platform of a load-carrying vehicle, and to provide a parallel and prolonging extension of this load-carrying platform.

According to the invention, the extension has two characteristic positions: a deployed position in which it forms a supporting surface able to safely support a load or part of a load and at least one stationary or moving person; and a retracted position of lesser width, in which position it is retracted. The changeover from one to the other of these characteristic positions is accomplished via a pivoting movement of the assembly within a plane parallel to the plane of support of the lateral extension.

The deployable structure according to the invention incorporates a multitude of supports or elements that are preferably rectilinear, and that are juxtaposed in a parallel manner in relation to each other, each incorporating a central portion, an interior extremity intended to be connected to the vehicle, and an exterior extremity located on the opposing side, which is intended to be positioned towards the exterior. In the deployed position of the lateral extension, these elements extend substantially transversally in relation to the general direction of the lateral extension, and are sufficiently close together to form the bearing support surface constituting the lateral extension.

The lateral extension also includes a rigid longitudinal junction component which serves as an exterior longitudinal edge and which connects the elements, which are preferably rectilinear in relation to each other.

The preferably rectilinear mounting or components are assembled so as to pivot freely at each of their extremities—firstly, with regard to their interior extremities, on a longitudinal structure that is fixed in relation to the load-carrying platform, and, secondly, as regards their exterior extremities, on the connecting rigid longitudinal element.

In the extended position of the deployable structure, the preferably rectilinear elements bear, over part of their length, on a flat bearing surface that is adjacent and fixed in relation to the load-carrying platform, and protrude in a cantilever effect towards the exterior over the remainder of their length, with sufficient mechanical strength to safely bear a load or a stationary or moving person.

The invention also relates to a load-carrying vehicle comprising at least one load-carrying platform which is equipped, along at least one of its longitudinal edges, with such a bearing lateral extension.

Depending on the applications considered, one can anticipate installing such a lateral structure on one of the sides or on the two sides of the load-carrying platform of the load-carrying vehicle.

Similarly, when the vehicle has multiple load-carrying platforms, which are positioned in succession to each other or on top of each other, both of these platforms or just one of them can be equipped with one or two lateral extensions. In addition, although the deployable structure according to the invention is preferably intended to be assembled on the side of an upper load-carrying platform, use on a lower loading platform is nonetheless perfectly feasible.

On the longitudinal part that constitutes the edge of the gangway, one can fit a railing structure to ensure the operator's safety. Due to the kinematics of retracting the gangway to its retracted position, the railing remains in place such as to continue playing its protective role even when the gangway is not deployed. Thus, there is always bordering protection.

BRIEF DESCRIPTION OF THE DRAWINGS

Other features and advantages of the invention will become apparent upon reading the following detailed description, the which description is based upon a simple mode of implementation that is to be considered to be an exhaustive example, and makes reference to the appended drawings, in which.

DETAILED DESCRIPTION OF THE PREFERRED EMBODIMENTS

Figure 1:
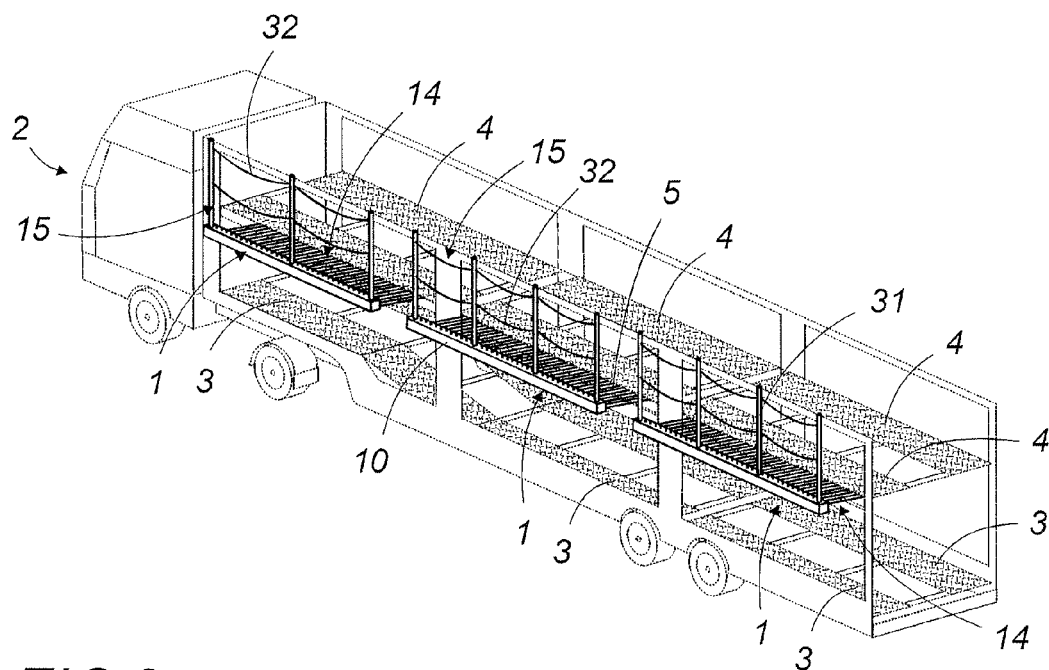
FIG. 1 is a schematic profile view of a car-carrying truck having its upper load-carrying platform equipped with a lateral extension according to the invention, in the deployed position.

The invention proceeds from the general inventive idea consisting of providing, along the length of a vehicle's load-carrying platform, a laterally deployable structure that provides support and gangway for people; it is horizontally retractable—i.e. parallel to the ground—using a multitude of preferably rectilinear support elements positioned at short intervals and assembled so as to pivot freely—at each of their extremities—around a vertical axis, firstly for the interior extremity positioned towards the vehicle, on a long beam that is fixed in relation to the load-carrying platform, or on the long beam of this platform, and, secondly, for the opposing extremity positioned towards the exterior, on a connecting rigid longitudinal tube. The preferably rectilinear elements bear, over part of their length, via their interior extremities, on a flat bearing surface that is fixed in relation to the load-carrying platform, so as to be cantilevered towards the exterior over the remainder of their length, with sufficient mechanical strength to safely bear a load, or part of a load, or at least one stationary or moving person.

This structure consists of a multitude of multiply articulated elements—preferably rectilinear and juxtaposed—so as to allow distribution of the forces and stresses exerted upon it.

To ensure satisfactory compactness, the preferably rectilinear elements are juxtaposed, or else interconnected, in the retracted position.

To comply with regulations, the lateral extension according to the invention fits within the road or rail gauge permitted for the transportation vehicle when unloaded.

In addition, the movements of extension and retraction can be motor-driven and remotely controlled semi-manually or automatically.

To facilitate access by an operator, a ladder, stairway, a step, or any other means of easy access from the ground can be integrated into the structure.

Without having any restricted character, described in detail below is a particular embodiment of such a retractable lateral extension, shown, by way of an example, in FIGS. 1 to 13 of the drawings. Equivalent items shown in the various figures are assigned the same reference numerals.

In the following description, the concepts of top and bottom, lower and upper, front and rear, lateral, transversal and longitudinal, etc., will be defined in relation to the vehicle on which the lateral extension is intended to be assembled, and according to the normal direction of travel of this vehicle.

Figure 2:
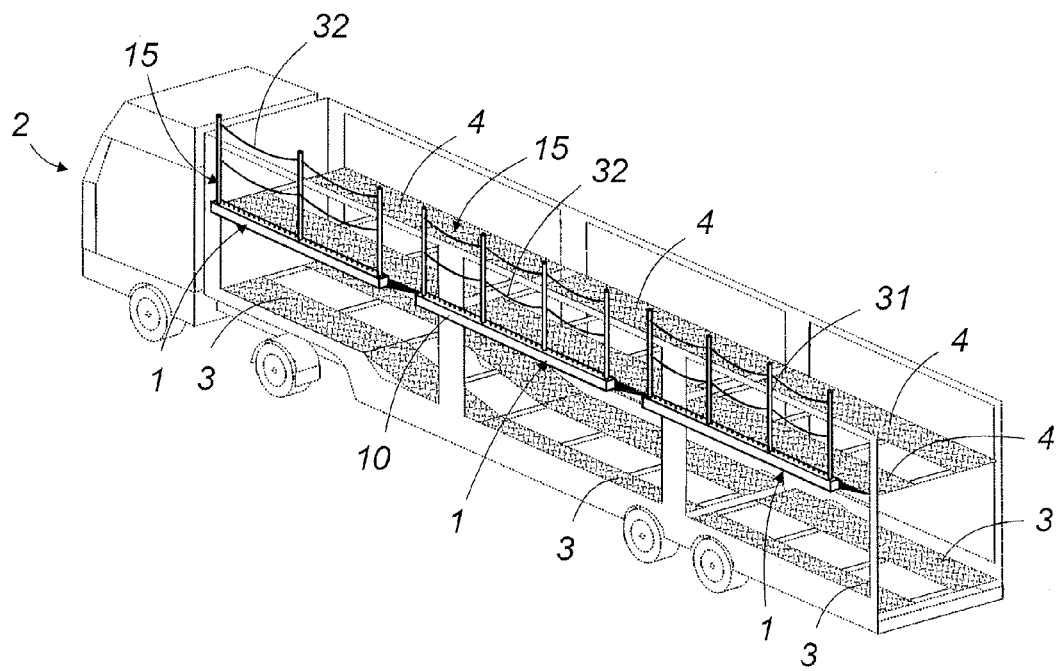
FIG. 2 is a schematic profile view of a car-carrying truck with its upper load-carrying platform equipped with a lateral extension according to the invention, in the retracted position.

FIGS. 1 and 2 illustrate an example of a particular application of a lateral extension 1 on a car-carrying truck 2, which includes several successive lower load-carrying platforms 3 and several successive upper load-carrying platforms 4.

In this application, the lateral extension 1 is assembled along the length of each upper load-carrying platform 4 of the car-carrying truck 2, and extends along the side of the vehicle. Of course, one could also consider a lateral extension in the form of a continuous structure along the length of the upper platforms 4, or a lateral extension limited to only one or just certain of the upper load-carrying platforms 4. Similarly, one or more lateral extensions of this type could be installed on the other side of the vehicle, or on one or more lower load-carrying platforms 3.

The deployable structure or lateral extension 1 has two positions: a deployed position, illustrated in FIG. 1—in which state it notably might be when the vehicle is halted—in which it extends from the side of the load-carrying platform concerned 4, and allows the operator to walk along the length of the platform; and a retracted position, illustrated in FIG. 2, in which it is folded against the load-carrying platform 4. This latter position is maintained when the vehicle is traveling.

The lateral extension 1 can generally be used to support a load, or part thereof, as well as to provide gangway for an operator.

It consists of a multitude of preferably rectilinear individual support elements 5—made of metal, for example, and formed from, for instance, shafts, bars, strips, or even from conrods or some other implementation—wires, cables, rods or some other element—that each incorporate a central section 6 with an interior extremity 7 connected to the vehicle, and an exterior extremity 8 located at the opposing end and oriented towards the exterior.

In the example shown, the central portion 6 of the preferably rectilinear elements 5 is substantially straight, while their interior extremity 7 is curved downwards and their exterior extremity 8 is curved upwards. The interior extremities 7 and exterior extremities 8 of the metal shafts 5 preferably incorporate a threading 9 on their end portion. This element is given here only as an exhaustive example.

The deployable structure 1 according to the invention also includes a rigid longitudinal junction component 10, that serves as its outer longitudinal edge and on which the preferably rectilinear shafts 5 are pivotally assembled. In the illustrated implementation, there is, for example, a hollow section bar with a closed cross-section and, notably, a hollow tube (shown only in FIGS. 10 and 11). This rigid longitudinal element gives, through its own rigidity, strength and stability to the lateral extension 1, and enables the shafts to be joined with each other so as to constrain them to a joint rocking movement.

The rods 5 are assembled so that they pivot around a vertical axis at each of their ends—firstly, with regard to their interior extremities 7, on an auxiliary long beam 11 secured in a fixed manner to the load-carrying platform and, secondly, as regards their exterior extremities 8, on the rigid longitudinal junction component 10.

The auxiliary long beam 11 can be a longitudinal structure of the vehicle's load-carrying platform. It could be, for example, its side beam 12 abutting the lateral extension 1, or a separate section bar fixed to or integral with it.

The interior extremities 7 of the shafts 5 are assembled on the edge section bar of the load-carrying platform, or on the auxiliary long beam 11, but on the interior side in relation to the vehicle.

As such, in the deployed position, the preferably rectilinear rods 5 bear, with regard to the first part of their central section 6, on an adjacent flat bearing surface 13 that is fixed in relation to the load-carrying platform 4. They are cantilevered towards the exterior over the remainder of their length.

The flat bearing surface 13 on which the preferably rectilinear rods 5 bear over a part of their length can be independent, or can form part of the fixed auxiliary long beam 11 on which the shafts 5 are assembled at their interior extremities 7. This would preferably be by means of the flat upper face of this fixed longitudinal structure 11 or the adjacent face of the edge section bar 12 of the load-carrying platform.

In the deployed position, the preferably rectilinear shafts 5 are substantially parallel to each other—for example, at a distance close to or equal to their thickness. They bear on the flat bearing surface 13 that is fixed in relation to the load-carrying platform 4, and extend transversely to this load-carrying platform 4 as from the said bearing surface, cantilevered towards the exterior of the vehicle.

The preferably rectilinear shafts 5 extend as far as the rigid longitudinal junction component 10, which is and which remains substantially parallel to the load-carrying platform 4, and which is located at a distance from the load-carrying platform 4, offset laterally in relation to it, when the extension 1 is in the deployed position.

In the retracted position of the lateral extension 1, the preferably rectilinear shafts 5 are juxtaposed one beside the other so as to occupy as little space as possible. They can be rendered adjoining in this position by a compound movement obtained by complementary technical means, structures or forms.

The preferably rectilinear shafts 5 are sufficiently long and sufficiently numerous, and are sufficiently close to each other—at a compact spacing of, for instance, one shaft's thickness—to form, in the deployed position, a flat and robust support surface, i.e. one that is not easily deformable and that can provide a support surface 14 with satisfactory strength and stability, on which the operator can walk comfortably and in safety, and on which a load or part of a load can rest.

A protective structure to prevent the operator or any other person from falls—notably a railing 15—can advantageously be provided on the outer edge of the lateral extension 1, preferably on the rigid longitudinal junction component 10, to further improve operator safety.

In the retracted position of the lateral extension, the rigid longitudinal junction component 10 carrying the railing 15 is positioned close to the fixed auxiliary long beam 11, and is preferably abutting against it or even on it. The preferably rectilinear shafts 5 are then highly inclined, and are very close to each other—they can, for example, be touching each other.

The change from the deployed position to the retracted position of the lateral extension 1 is accomplished via an overall pivoting movement, involving elementary movements of each of the preferably rectilinear shafts 5 around a vertical axis passing through their interior extremity 7 connected to the fixed auxiliary long beam 11, in relation to the load-carrying platform 4. The rigid longitudinal junction component 10 moves longitudinally, towards the load-carrying platform 4, while always remaining substantially parallel to it.

The railing 15 remains in place and effective in this position.

The transition from the retracted position to the deployed position of the extension 1 is accomplished in the same manner, via a pivoting movement in the opposite direction.

The transition from one to the other of these characteristic positions can be performed manually—for example, by pulling or pushing the rigid longitudinal junction component 10, which may include, for this purpose, one or more handles, which are not illustrated, or some other manual gripping and actuating device allowing switching from one to the other of the characteristic positions.

A motor-driven and automated actuation system—cylinder-based, for example—with manual or automatic control, can also be considered. The operation can be controlled remotely.

In addition, a blocking and locking device (not shown) is also provided for, so as to ensure that the lateral extension is maintained in each of its two characteristic positions; the said blocking device requires prior unlocking to allow switching from one characteristic position to the other.

Various automatic locking systems—based on jacks or some other mechanism—can be used for this purpose.

For the example illustrated in the various figures, the lateral extension 1 according to the invention is fixed to the side beam 12 of an upper load-carrying platform 4 on the car-carrying truck 2, and extends along this side beam 12.

Conventionally, the side beam 12 has an L-section form with a central core 16, a lower surface 17 and an upper surface 18 that acts as a flat bearing surface 13.

According to one embodiment, the side beam 12 can be a securing rail or section bar 19 (only shown in FIGS. 12 and 13) that secures the lateral extension 1 to the side beam 12 and, via this component, to the adjacent load-carrying surface 4.

The securing rail 19 is a longitudinal hollow metal structure—preferably fabricated. This securing rail 19 is connected to the inner side of the side beam 12 of the load-carrying surface, and secured to it—preferably by bolting, for example—via bolt lugs 20, or is integral with it.

The securing rail 19 is secured in chock bearing, via its upper wall 21, against the underface of the upper surface 18 of the side beam 12 and, via its exterior side wall 22, against the inner face of the central core 16 of the long beam 12. It thereby constitutes a solid securing point for the lateral extension 1 according to the invention.

The securing rail 19 has a series of upper drillings 23 in its upper wall 21 and lower drillings 24 in its bottom wall 25, opposing each other in pairs, thereby forming a series of fully penetrating openings in which one can insert the downwardly curved interior extremities 7 of the preferably rectilinear shafts 5.

Once engaged in the drillings 23 and 24 of the securing rail 19 forming the fully penetrating openings, the downwardly curved interior extremities 7 of the preferably linear shafts 5 are held in position by any means allowing their free pivoting, notably by any means of immobilization of sideways movement in relation to the securing rail 19 forming the equivalent of a bearing—for example, as illustrated, by means of washers and nuts, such as 26, engaged upon their end threading 9.

The rigid longitudinal junction component 10 is, for example, a hollow tube of square cross-section, preferably closed. It also incorporates a series of upper drillings 27 in its upper wall 28, and a series of lower drillings in its lower wall 29, opposing each other in pairs, so as to thereby form a series of fully penetrating openings in which one can insert the upwardly curved exterior extremities 8 of the preferably rectilinear shafts 5.

As previously mentioned, the upwardly curved exterior extremities 8 of the preferably rectilinear shafts 5, stated as an example, are held in position once engaged in the upper drillings 27 and lower drillings forming fully penetrating openings in the edge and rigid longitudinal junction component 10, forming the equivalent of a bearing but allowing their free pivoting—for example, as illustrated, by means of washers and nuts, such as 26, engaged upon their end threading 9.

Figure 11:
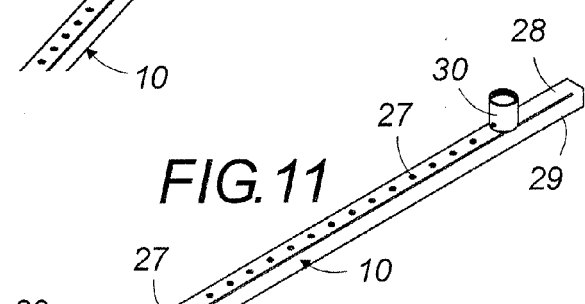
Figure 12:
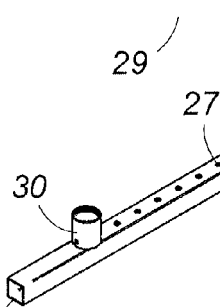
FIG. 12 is a perspective view of a securing rail serving to secure the rods to the lateral long beam of the load-carrying platform.
Figure 12:
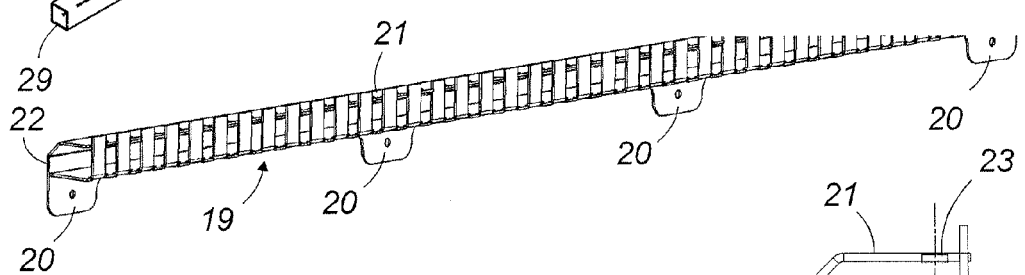
Figure 13:
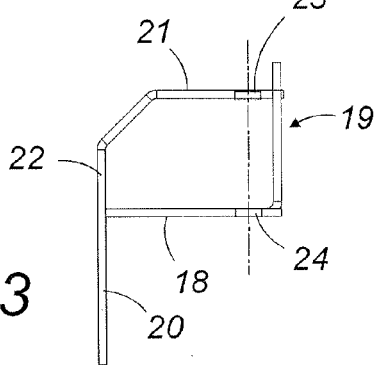
FIG. 13 is a cross-sectional view of the securing rail of FIG. 12.

According to a preferred variant shown in FIG. 11, the edge and rigid longitudinal junction component 10 can also be baseplates 30—cylindrical, for instance—protruding from the upper wall 28, in which one can fit posts 31—also cylindrical, for instance.

These posts 31 can advantageously enable one to implement a railing 15 on the exterior edge of the lateral extension 1 according to the invention, to further improve operator safety. For this, cables or lines 32 can be attached and tensioned between these posts 31, for example by means of the fully penetrating openings 33 provided in the posts 31.

To form the lateral extension 1 according to the invention, the preferably rectilinear shafts 5 are positioned bearing over a portion of their length on the side beam 12. Each downwardly curved interior extremity 7 is engaged in a pair of upper drillings 23 and lower drillings 24 of the securing rail 19, and is held in position as described above—for instance, by means of a nut 26.

Figure 3:
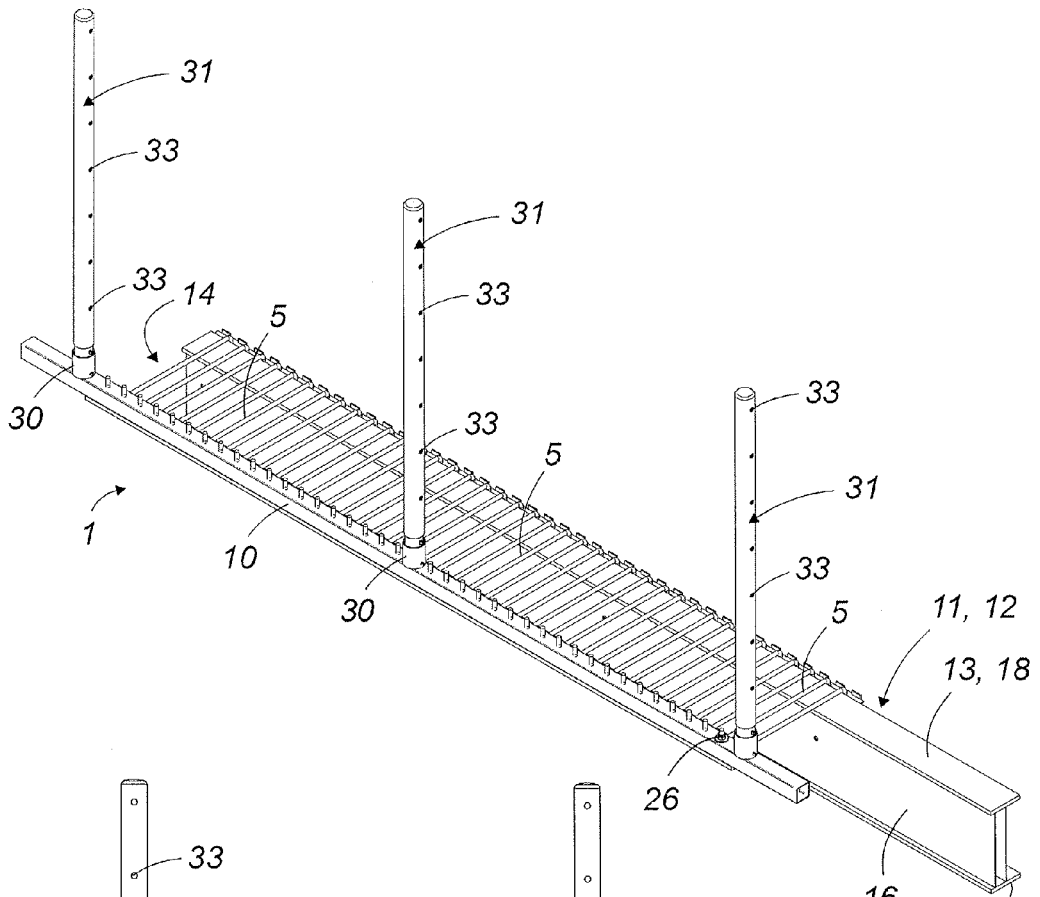
FIG. 3 is a perspective view of an example of a lateral extension according to the invention, in the deployed position.
Figures 4, 5:
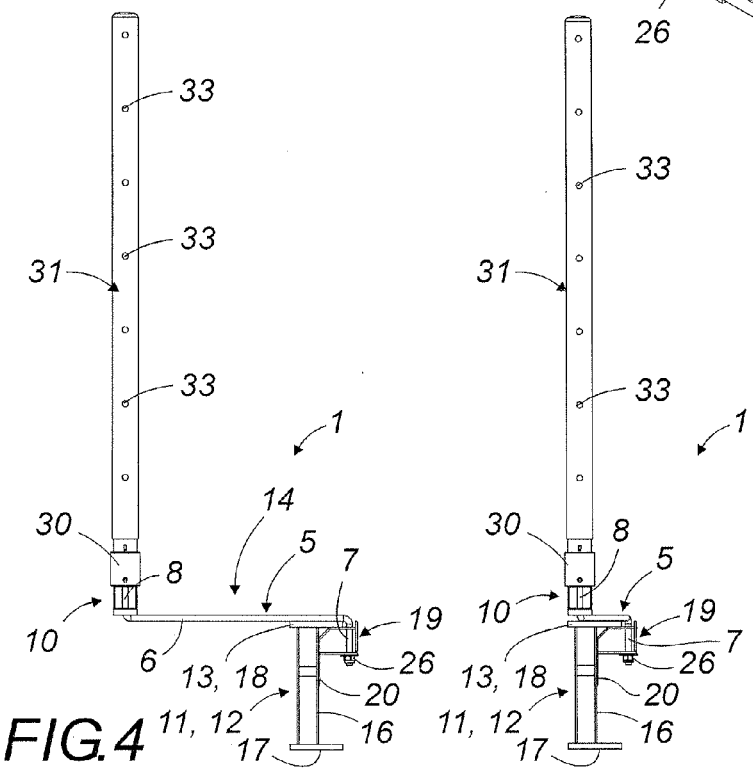
FIGS. 4 and 5 are front views respectively of this lateral extension, respectively in the deployed position and in the retracted position.
Figure 6:
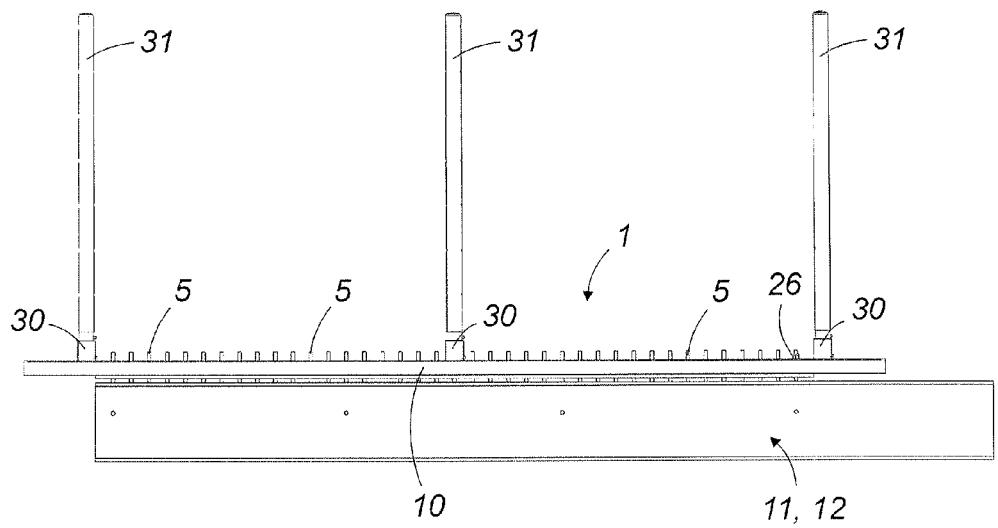
FIG. 6 is a side view of the lateral extension.
Figure 7:
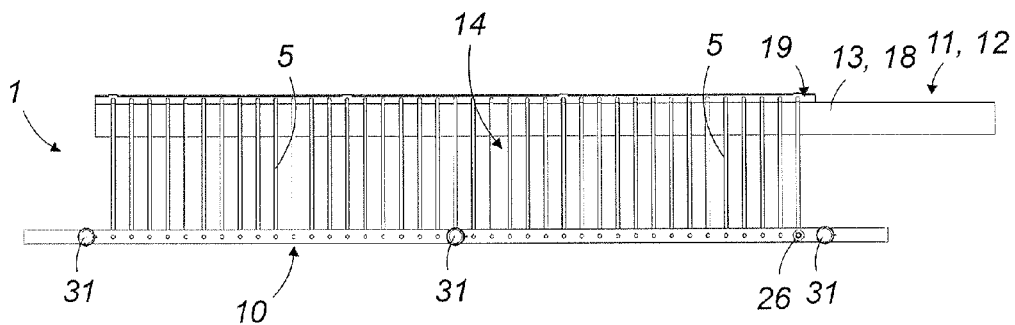
FIGS. 7 and 8 are top views of the lateral extension, respectively in the deployed state and in the retracted state; not all the preferably rectilinear elements are shown in FIG. 8.

As illustrated in FIGS. 3, 4 and 7, in the deployed position of the extension 1, the shafts 5 rest bearing against the upper bearing surface 18 of the side beam 12 over part of their length, and extend cantilevered towards the exterior over the remainder of their length.

As the shafts 5 bear over a part of their length against the upper face of the long beam, the extension 1 thus obtained is very strong and can, despite the cantilever, bear a relatively heavy weight—for example, a load or portion of a load that is considerably greater than that of a person standing or walking on the protruding mounting constituted by the lateral extension 1.

The upwardly curved exterior extremity 8 of each of the shafts 5 is engaged in a pair of upper drillings 27 and lower drillings of the rigid longitudinal junction component 10, and is held in position as described previously—for example, by means of a nut 26.

The rigid longitudinal junction component 10 enables one to connect the preferably rectilinear shafts 5 to each other, and ensures a coordinated and simultaneous pivoting of the various preferably rectilinear shafts 5 within a single overall movement, in order to change from one characteristic position to the other. It also endows great rigidity upon the lateral extension.

Figure 8:
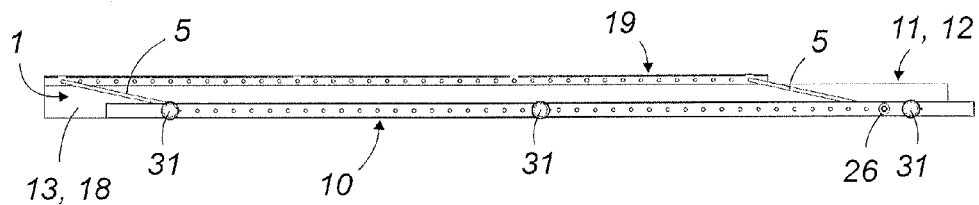
Figure 9:
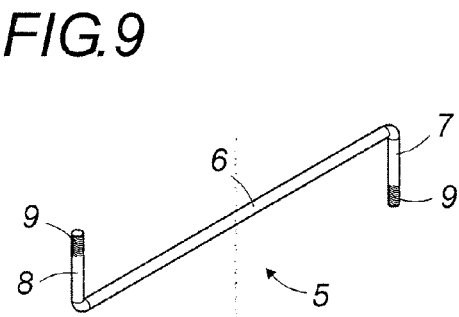
FIG. 9 is a perspective view of an example of a rectilinear element in the form of a rod, which is illustrated in isolation.
Figure 10:
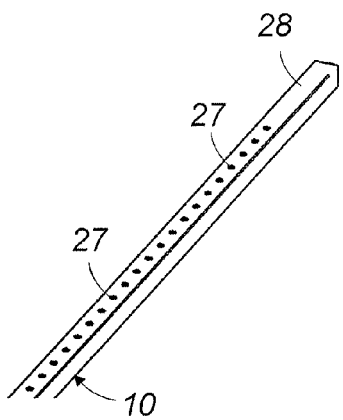
FIGS. 10 and 11 are perspective views of a rigid longitudinal connecting element of the lateral extension, illustrated in isolation, shown respectively as a basic variant and as a preferred embodiment with railings.

To enter the retracted position, the preferably rectilinear shafts 5 pivot simultaneously in a horizontal plane, with each one pivoting around a vertical axis passing through its downwardly curved interior extremity 7, and reaching an entirely inclined or practically entirely inclined position, supported by the upper bearing surface 18 of the side beam 12, as illustrated in FIGS. 5 and 8.

During this movement, the rigid longitudinal junction component 10 remains substantially parallel to the side beam 12, and preferably also comes to rest on the upper surface 18 of the side beam 12 (FIG. 8).

This way, in the retracted position, the lateral extension 1 fully vanishes and does not protrude laterally. The width of the vehicle is not increased due to the presence of the lateral extension 1.

To facilitate access to the deployable structure according to the invention, one can provide a ladder, stairway or step, or any other fixed, folding or retractable means of access.

The railing borne by the edge and rigid longitudinal junction component 10 remains in an operative safety-enhancing state for the protection of the operator in all positions of the deployable lateral structure according to the invention.

Evidently, for regulatory reasons, the vehicle width must fit within the road or rail gauge when the lateral extension is in the retracted position.

Obviously, the invention is not limited to the preferred embodiment described above and shown in the various figures: an appropriately knowledgeable professional can introduce numerous modifications and devise other variants without departing from the scope or context of the invention defined by the claims.

The invention claimed is:

1. A load-carrying lateral extension designed to be assembled along a length a longitudinal side of at least one load-carrying platform carrying the load of a load transport vehicle, to act as a supporting surface for bearing loads or for circulation of an operator, wherein the load-carrying lateral extension comprises:
    a side beam (12) integral with or fixed along the longitudinal side of the at least one load-carrying platform;
    a rigid longitudinal junction component (10) forming an exterior limit of the load-carrying lateral extension;
    a multitude of individual preferably rectilinear supporting components (5) being retractable by pivoting around respective vertical axes towards each other, and connecting the side beam (12) to the rigid longitudinal junction component;
    each of the rectilinear supporting components is:
        articulated pivotally at a first extremity thereof so as to pivot on the side beam (12) around the vertical axis, the vertical axis being located on an inward side of the side beam;
        supported at the first extremity over a fraction of a length thereof by a load-carrying surface of the side beam;
        articulated pivotally at a second extremity thereof on the rigid longitudinal junction component (10); and
        at the second extremity thereof, each of the rectilinear supporting components engages the rigid longitudinal junction component (10), and is cantilevered laterally in relation to the at least one load-carrying platform, so as to form the supporting surface acting as a means of support and a route for passage and circulation of the operator.

2. The lateral extension according to claim 1, wherein the rectilinear supporting components (5) are at least one of retractable, shafts, bars, blades, tensioned cables and tensioned lines, that are substantially parallel with respect to each other and free to pivot individually while achieving an overall pivoting movement.

3. The lateral extension according to claim 1, wherein the rectilinear supporting components (5) are separated from one another by at least once a thickness thereof when in an extended position and the rectilinear supporting components (5) abut when in a retracted position.

4. The lateral extension according to claim 1, wherein the side beam (12) abuts with the load-carrying platform.

5. The lateral extension according to claim 1, wherein the lateral extension has an associated railing (15) supported by the rigid longitudinal junction component (10).

6. The lateral extension according to claim 1, wherein an overall width of the load transport vehicle fits within either a width of a road or rail gauge, when the lateral extension is retracted.

7. The lateral extension according to claim 1, wherein the lateral extension provides at least one of support for passageway for the operator, and support for either a load or a portion of a load.

8. The lateral extension according to claim 1, wherein the lateral extension is usable for each side of a given load-carrying platform.

9. The lateral extension according to claim 1, wherein the lateral extension is useable for several load-carrying surfaces.

10. The lateral extension according to claim 1, wherein:
the lateral extension comprises the rectilinear supporting components which are multiple rectilinear shafts (5) juxtaposed next to and parallel with one another, and, in a deployed position of the lateral extension (1), the multiple rectilinear shafts (5) extend substantially transversely in relation to a general direction of the lateral extension (1), and are close enough to one another to form the supporting surface (14) of the lateral extension (1), each of the rectilinear shafts (5) incorporate a central portion (6), the first extremity which is an interior extremity (7) designed to be connected to the vehicle (2), and the second extremity which is an exterior extremity (8) located on an opposite side of the rectilinear shaft and intended to be positioned towards an exterior;
the lateral extension incorporates an edge and connecting rigid longitudinal member (10) acting as an exterior longitudinal edge of the lateral extension (1) and connecting the rectilinear shafts (5) to one another;
the rectilinear shafts (5) are assembled so as to pivot freely at each of the interior and the exterior extremities (7, 8), firstly, with regard to the interior extremities (7), on a longitudinal structure (11) that is fixed in relation to the load-carrying platform (4) and, secondly, with regard to the exterior extremities (8), on the edge and connecting rigid longitudinal member (10);
in the deployed position of the lateral extension (1), a part of the central portion (6) of the rectilinear shafts (5) bears upon an adjacent flat bearing surface (13) that is fixed in relation to the load-carrying platform, and the rectilinear shafts are cantilevered towards the exterior over a remainder of the central portion (6), with sufficient mechanical strength to safely support at least a person.

11. The lateral extension according to claim 10, wherein the edge and connecting rigid longitudinal member (10) is either a hollow section bar or a hollow tube of closed square cross-section.

12. The lateral extension according to claim 10, wherein the longitudinal structure (11) that is fixed in relation to the load-carrying platform (4) is a longitudinal structure of either the load-carrying platform (4) or the side beam (12) of the load-carrying platform (4).

13. The lateral extension according to claim 12, wherein the lateral extension incorporates either a securing section bar or rail (19) on which the interior extremities (7) of the rectilinear shafts are assembled so as to pivot freely, and the securing section bar or rail (19) being fixed to the side beam (12) of the load-carrying platform (4).

14. The lateral extension according to claim 1, wherein the first extremities (7) of the rectilinear supporting components (5) curve downwardly and the second extremities (8) of the preferably rectilinear supporting components (5) curve upwardly.

15. The lateral extension according to claim 1, wherein the first extremities (7) and the second extremities (8) of the rectilinear supporting components (5) are threaded (9).

16. The lateral extension according to claim 10, wherein the adjacent flat bearing surface (13), which is fixed in relation to the adjacent load-carrying platform (14), on which the rectilinear shafts (5) bear over a part of the central portion (6) thereof, is an upper surface (18) of the side beam (12) of the load-carrying platform (4).

17. The lateral extension according to claim 2, wherein upper walls (28, 21) and lower walls (29, 25) of a hollow section bar serving as the rigid longitudinal junction component (10) or of a securing rail (19) have corresponding drillings (27, 23, 24) through which either the second extremities (8) or the first extremities (7) of the rectilinear supporting components (5) pass.

18. The lateral extension according to claim 17, wherein either the second extremities (8) or the first extremities (7) of the rectilinear supporting components (5) are immobilized to prevent sideway movement thereof in relation to either the rigid longitudinal junction component (10) or a securing rail (19), either by a means of sideway movement prevention forming a bearing, or by a means of immobilization incorporating a washer and nut (26).

19. The lateral extension according to claim 1, wherein the lateral extension incorporates either a protective structure or railing (15), assembled on the rigid longitudinal junction component (10), to prevent a person from falling.

20. The lateral extension according to claim 1, wherein, in a retracted position of the lateral extension (1), the rigid longitudinal junction component (10) is located on a longitudinal long beam (11) that is fixed in relation to the load-carrying platform (4).

21. The lateral extension according to claim 1, wherein, to facilitate changing between a retracted position and a deployed position, the lateral extension incorporates either a manual gripping and actuation device located at the rigid longitudinal junction component (10), or a manually or automatically controlled automated actuation system.

22. The lateral extension according to claim 1, wherein the lateral extension comprises a locking device ensuring the maintenance of the lateral extension (1) in each of a retracted and a deployed position thereof, with the locking device has to be unlocked beforehand to allow changeover from the retracted position and the deployed position.

23. A car-carrying vehicle (2) incorporating at least one load-carrying platform (4), wherein the car-carrying vehicle (2) being equipped, along at least one longitudinal edge of the at least one load-carrying platform (4), with a load-carrying lateral extension designed to be assembled along a length of at least one longitudinal side of the at least one load-carrying platform, a surface of the at least one load-carrying platform carrying the load of the car carrying vehicle and the load-carrying lateral extension forming a supporting surface for bearing loads or for circulation of an operator, wherein the load-carrying lateral extension comprises:
a side beam (12) integral with or fixed alongside the surface of the at least one load-carrying platform;

a rigid longitudinal junction component (10) forming an exterior limit of the load-carrying lateral extension;

a multitude of individual preferably rectilinear supporting components (5) retractable by pivoting around a respective vertical axis towards each other, and connecting the side beam (12) to the rigid longitudinal junction component;

each of the rectilinear supporting components is
- articulated pivotally at one extremity thereof on the side beam (12) around the vertical axis, the vertical axis being arranged on an interior side of the side beam which faces the at least one load-carrying platform;
- supported at the extremity over a fraction of a length thereof by a load-carrying surface of the side beam; and
- articulated pivotally at an opposite extremity on the rigid longitudinal junction component (10); and
- the opposite extremity of the rectilinear supporting component engages the rigid longitudinal junction component (10), and is cantilevered laterally in relation to the surface of the at least one load-carrying platform, to form the load-carrying lateral extension acting as a means of support and a route for passage and circulation of the operator.

\* \* \* \* \*